US012580269B2

(12) United States Patent
Kim et al.

(10) Patent No.: US 12,580,269 B2
(45) Date of Patent: Mar. 17, 2026

(54) BATTERY MODULE AND BATTERY PACK INCLUDING THE SAME

(71) Applicant: LG ENERGY SOLUTION, LTD., Seoul (KR)

(72) Inventors: Gwan Woo Kim, Daejeon (KR); Jehwan Sin, Daejeon (KR); Junyeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 614 days.

(21) Appl. No.: 17/925,542

(22) PCT Filed: Oct. 20, 2021

(86) PCT No.: PCT/KR2021/014647
§ 371 (c)(1),
(2) Date: Nov. 15, 2022

(87) PCT Pub. No.: WO2022/092676
PCT Pub. Date: May 5, 2022

(65) Prior Publication Data
US 2023/0198076 A1     Jun. 22, 2023

(30) Foreign Application Priority Data
Oct. 26, 2020     (KR) ........................ 10-2020-0139307

(51) Int. Cl.
*H01M 50/289*          (2021.01)
*H01M 10/613*          (2014.01)
*H01M 50/211*          (2021.01)

(52) U.S. Cl.
CPC ....... *H01M 50/289* (2021.01); *H01M 10/613* (2015.04); *H01M 50/211* (2021.01)

(58) Field of Classification Search
CPC ............. H01M 50/289; H01M 10/613; H01M 50/211; H01M 2220/20; H01M 10/0481; H01M 10/625; H01M 10/647; H01M 10/6551; H01M 10/6554; H01M 10/6555; H01M 10/6556; H01M 10/655; H01M 50/20; H01M 50/209; Y02E 60/10
See application file for complete search history.

(56) References Cited

U.S. PATENT DOCUMENTS 7,989,104 B2 *   8/2011   Jeon .................. H01M 10/0472
                                                        429/159
10,873,114 B2 *  12/2020  Ju ..................... H01M 10/6551
                    (Continued)

FOREIGN PATENT DOCUMENTS

CN          203760540 U   *   8/2014   ............. Y02E 60/10
CN          104868073 A   *   8/2015   ............... B60K 1/04
                    (Continued)

OTHER PUBLICATIONS

International Search Report for PCT/KR2021/014647 mailed on Jan. 27, 2022.

*Primary Examiner* — Kaity V Chandler
(74) *Attorney, Agent, or Firm* — Birch, Stewart, Kolasch & Birch, LLP

(57)          ABSTRACT
A battery module includes a plurality of battery cell stacks, a module frame having unit housing sections in which the plurality of battery cell stacks are housed, respectively, and a shaping part formed between the unit housing sections.

10 Claims, 7 Drawing Sheets

(56) References Cited

U.S. PATENT DOCUMENTS

| | | | |
|---|---|---|---|
| 2002/0064708 A1* | 5/2002 | Asahina | H01M 50/26 |
| | | | 429/185 |
| 2003/0077508 A1* | 4/2003 | Asahina | H01M 50/103 |
| | | | 429/153 |
| 2012/0177970 A1 | 7/2012 | Marchio et al. | |
| 2017/0047562 A1 | 2/2017 | Ogawa et al. | |
| 2018/0062127 A1 | 3/2018 | Lee et al. | |
| 2018/0183119 A1 | 6/2018 | Ju et al. | |
| 2019/0131596 A1 | 5/2019 | Yang et al. | |
| 2019/0198952 A1 | 6/2019 | Choi et al. | |
| 2019/0393452 A1* | 12/2019 | Kim | H01M 50/124 |
| 2020/0127255 A1 | 4/2020 | Moon et al. | |
| 2020/0350645 A1 | 11/2020 | Ju et al. | |
| 2020/0411816 A1 | 12/2020 | Yoneyama | |
| 2021/0151818 A1* | 5/2021 | Becker | B60L 50/64 |

FOREIGN PATENT DOCUMENTS

| | | | | |
|---|---|---|---|---|
| CN | 103380511 B | | 8/2016 | |
| CN | 107408647 A | * | 11/2017 | H01M 10/615 |
| CN | 108305968 A | | 7/2018 | |
| CN | 209249521 U | * | 8/2019 | Y02E 60/10 |
| CN | 214254530 U | * | 9/2021 | Y02E 60/10 |
| FR | 3076950 A1 | * | 7/2019 | H01M 10/6568 |
| JP | 2014-93238 A | | 5/2014 | |
| JP | 2017-37789 A | | 2/2017 | |
| JP | 2019-46578 A | | 3/2019 | |
| KR | 10-2018-0025643 A | | 3/2018 | |
| KR | 10-2018-0074133 A | | 7/2018 | |
| KR | 10-2019-0078521 A | | 7/2019 | |
| KR | 10-2020-0008624 A | | 1/2020 | |
| KR | 10-2066701 B1 | | 1/2020 | |
| KR | 10-2020-0044577 A | | 4/2020 | |
| KR | 10-2020-0078450 A | | 7/2020 | |
| WO | WO 2019/031175 A1 | | 2/2019 | |

* cited by examiner

【FIG. 1】
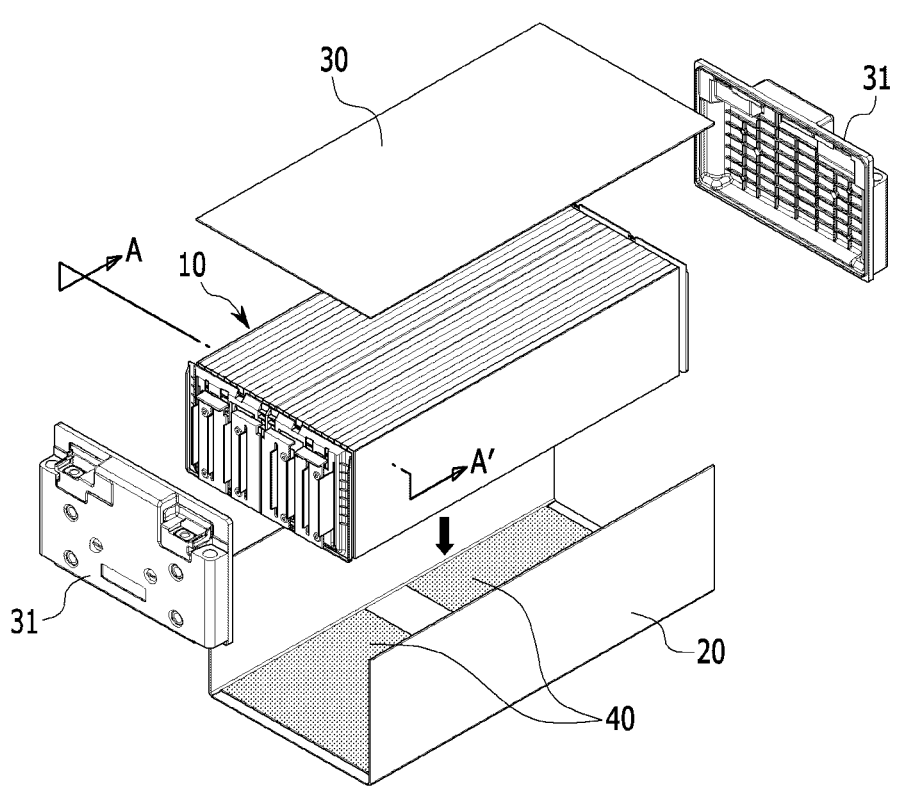
Conventional Art

【FIG. 2】
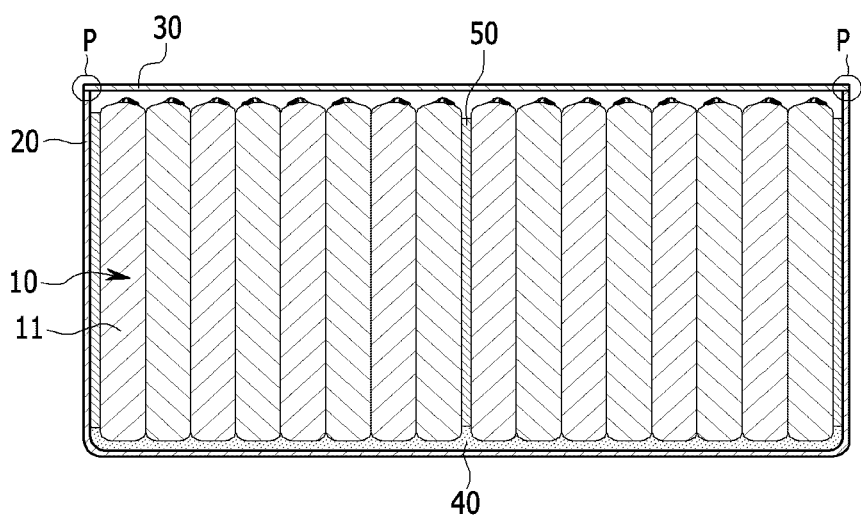
Conventional Art

【FIG. 3】
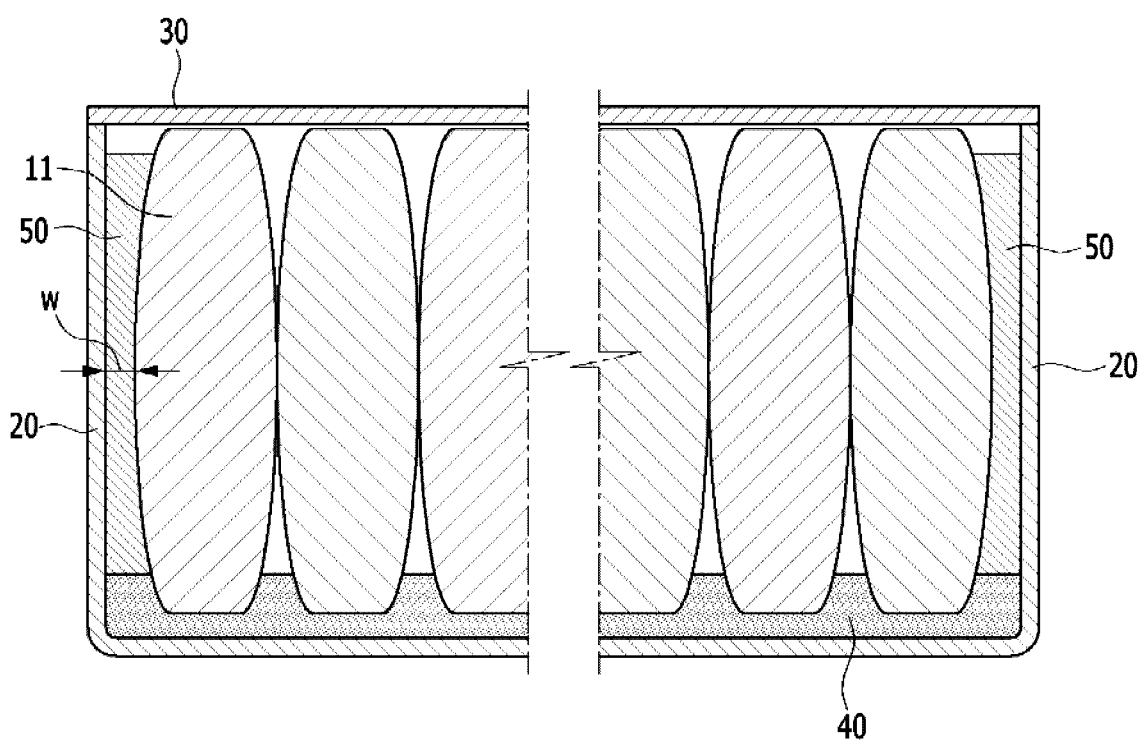
Conventional Art

【FIG. 4】
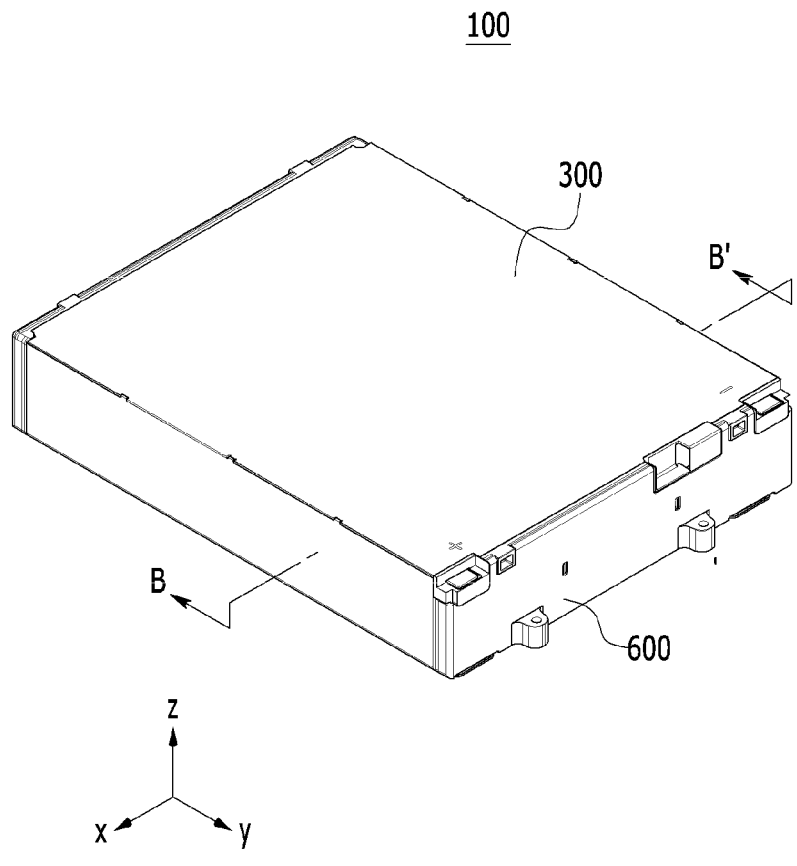

【FIG. 5】
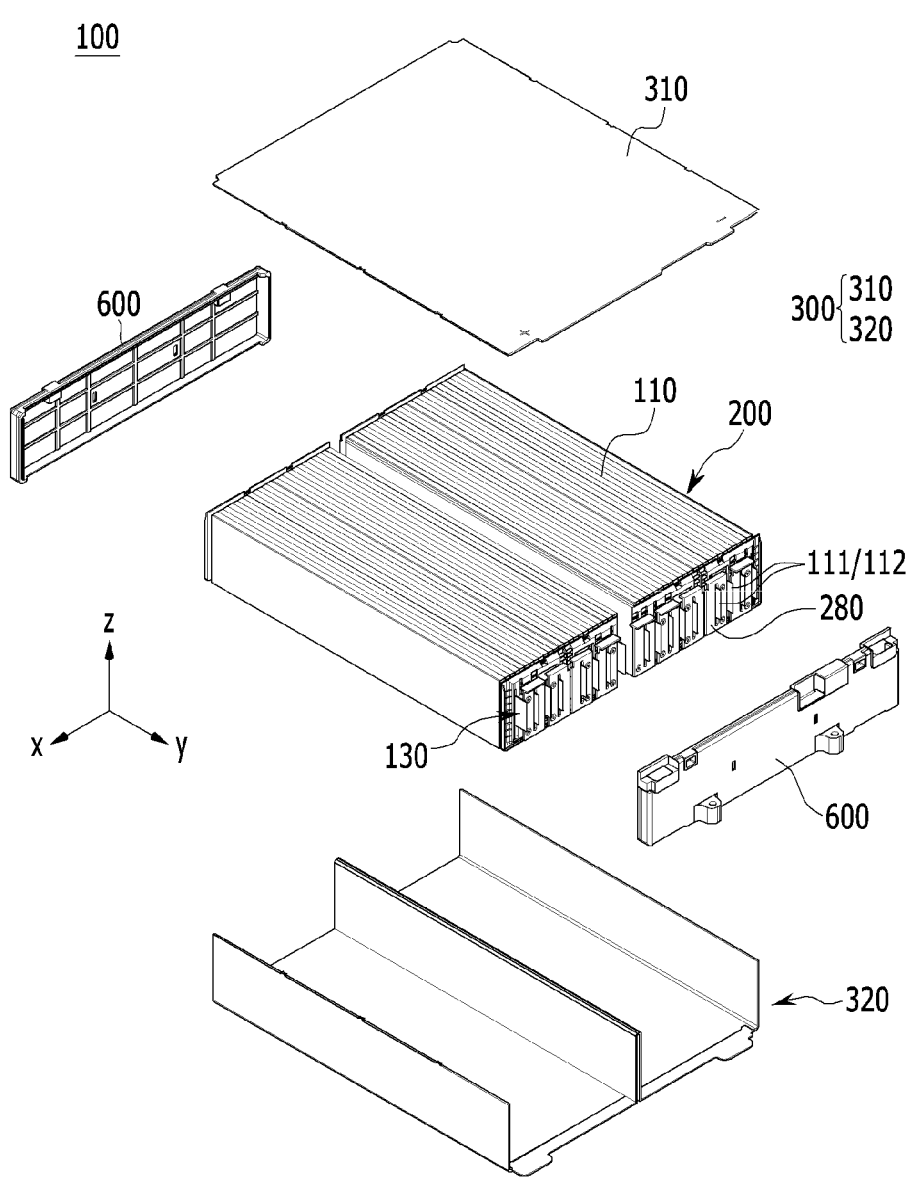

【FIG. 6】
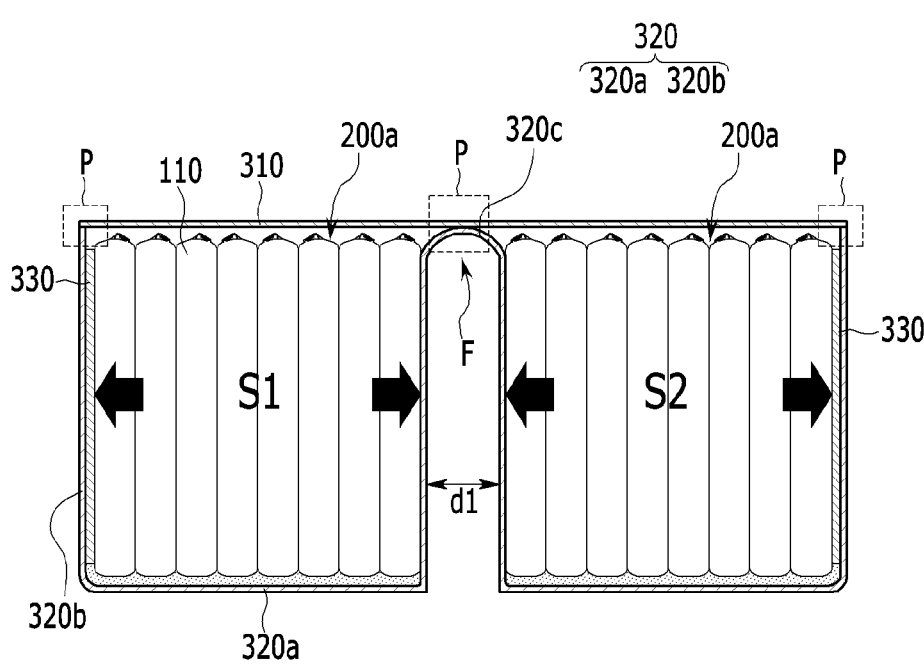

【FIG. 7】
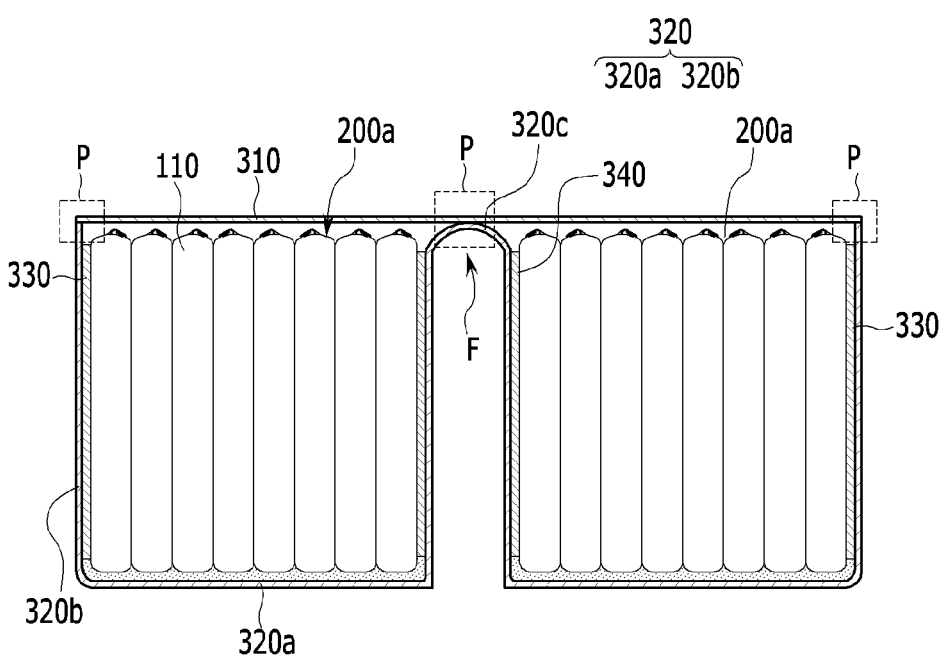

BATTERY MODULE AND BATTERY PACK INCLUDING THE SAME

CROSS CITATION WITH RELATED APPLICATION(S)

This application claims the benefit of Korean Patent Application No. 10-2020-0139307 filed on Oct. 26, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module having a shaping structure, and a battery pack including the same.

BACKGROUND

A secondary battery attracts considerable attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

Such a battery module includes a battery cell stack in which a plurality of battery cells are stacked, a module frame for housing the battery cell stack, and a compression pad formed between the module frame and the outermost battery cells of the battery cell stack or between a plurality of battery cells.

FIG. 1 is a perspective view showing a conventional battery module. FIG. 2 is a cross-sectional view showing a section A-A' of FIG. 1. FIG. 3 is a diagram showing a swelling phenomenon of the battery cell of FIG. 2.

Referring to FIGS. 1 and 2, the conventional battery module includes a battery cell stack 10 in which a plurality of battery cells 11 are stacked, a module frame 20 for housing the battery cell stack, an upper plate 30 for covering the upper part of the battery cell stack 10, a thermal conductive resin layer 40 located between the battery cell stack 10 and the bottom part of the module frame 20, and a compression pad 50 located between the plurality of battery cells 11 and/or between the outermost battery cell 11 and the module frame 20.

The compression pad 50 may be formed so as to cover most of the side surfaces of the module frame 20 corresponding to the battery cell 11. At this time, when the swelling phenomenon of the battery cells 11 occurs, the battery cells 11 may swell as shown in FIG. 3. Conventionally, even if the compression pad 50 is pressurized and compressed, there is a minimum compression thickness w at which the compression pad 50 is no longer compressed, which causes a problem that it is difficult to flexibly cope with the swelling phenomenon of the battery cells 11.

Further, as shown in FIG. 2, since the welding part P of the upper plate 30 and the module frame 20 is formed only on the both left and right side surfaces of the module width direction, which is the stacking direction of the battery cells 11, there is a problem that the rigidity is lowered.

DETAILED DESCRIPTION OF THE INVENTION

Technical Problem

It is an object of the present disclosure to provide a battery module having a shaping structure, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a plurality of battery cell stacks, a module frame having a plurality of unit housing sections in which the plurality of battery cell stacks are housed, respectively, and a shaping part formed between the plurality of unit housing sections.

The shaping part is formed by shaping the module frame, and the shaping part may include a cooling member.

The shaping part includes two side surface parts separated from each other and a connection part connecting the two side surface parts, and the two side surface parts of the shaping part are in contact with an outermost battery cell of a respective one of the plurality of battery cell stacks mounted to the.

The connection part may connect the two side surface parts at upper ends of the two side surface parts.

The connection part may have a curved surface that is protruded at the upper ends of the two side surface parts.

The two side surface parts of the shaping part may be perpendicular to a stacking direction of battery cells in the plurality of battery cell stacks.

The plurality of battery cell stacks are may be separated from each other by the shaping part.

The battery module may further include an upper plate that covers an upper part of the plurality of battery cell stacks mounted to the module frame, and the connection part of the shaping part may be coupled to the upper plate.

The module frame includes a plurality of bottom parts connected by the shaping part.

The plurality of bottom parts and the shaping part may be integrally formed.

The battery module may further include a compression pad in each of the plurality of unit housing sections, the compression pad located between the shaping part and an outermost battery cell of the battery cell stack in the respective unit housing section.

According to another embodiment of the present disclosure, there is provided a battery pack comprising the above-mentioned battery module.

Advantageous Effects

According to embodiments of the present disclosure, the shaping structure is formed in the central part, whereby the battery cell located in the central part can be in contact with the shaping structure of a metal material to facilitate heat dissipation. Thereby, the temperature deviation of the battery cell between the central part and the outermost part can be reduced.

In addition, the shaping structure is formed in the central part, thus capable of absorbing the swelling of the battery cell and performing the expansion control.

Further, the shaping structure formed in the central part and the upper plate are coupled, so that the welding section between the module frame and the upper plate can be increased to improve the rigidity.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing a conventional battery module;

FIG. 2 is a cross-sectional view showing a section A-A' of FIG. 1;

FIG. 3 is a diagram showing a swelling phenomenon of the battery cell of FIG. 2;

FIG. 4 is a perspective view of a battery module according to an embodiment of the present disclosure;

FIG. 5 is an exploded perspective view of the battery module of FIG. 4;

FIG. 6 is a cross-sectional view taken along the cutting line B-B' of FIG. 4; and FIG. 7 is a cross-sectional view showing a battery module obtained by modifying the embodiment of FIG. 6.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and same or like reference numerals designate same or like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 4 is a perspective view of a battery module according to an embodiment of the present disclosure. FIG. 5 is an exploded perspective view of the battery module of FIG. 4.

Referring to FIGS. 4 and 5, the battery module 100 according to the present embodiment includes a battery cell stack 200 in which a plurality of battery cells 110 are stacked, busbar frames 130 attached to both ends of the battery cell stack 200, a frame member 300 for housing the battery cell stack 200, and end plates 600 that wrap a cell block to which the battery cell stack 200 and the busbar frame 130 are coupled at both ends.

The battery cell 110 is preferably a pouch type battery cell. In the present embodiment, the battery cell stack 200 is stacked in the x-axis direction of FIG. 5, is disposed inside the frame member 300 in the z-axis direction, and can be cooled by a thermal conductive resin layer (not shown) formed on the bottom part of the frame member 300.

The frame member 300 for housing the battery cell stack 200 may include an upper plate 310 and a module frame 320. The module frame 320 includes a plurality of unit housing sections, and the upper plate 310 may be formed in a plate-shaped structure that covers the upper part of the battery cell stack 200 mounted to the module frame 320. The module frame 320 wraps the lower surface and both side surfaces of the battery cell stack, and the upper plate 310 may wrap the remaining upper surface (z-axis direction). The upper plate 310 and the module frame 320 are coupled by welding or the like in a state in which the edge parts corresponding to each other are in contact with each other, so that a structure that covers the battery cell stack 200 vertically and horizontally can be formed. The battery cell stack 200 can be physically protected through the upper plate 310 and the module frame 320. For this purpose, the upper plate 310 and the module frame 320 may include a metal material having a predetermined strength.

Meanwhile, although not specifically shown in the figure, the frame member 300 according to a modified example may be a mono frame in the form of a metal plate in which the upper surface, the lower surface, and both sides are integrated. That is, the frame structure may not be a structure in which the module frame 320 and the upper plate 310 are combined to each other, but may be manufactured by extrusion shaping and have a structure in which the upper surface, the lower surface, and both side surfaces are integrated.

A busbar frame 130 may be located on the opened first side (y-axis direction) and the opened second side (direction opposite to the y-axis) of the battery cell stack 200. The busbar frame 130 is located on the first side (y-axis direction) and the second side (direction opposite to the y-axis) of the battery cell stack 200 to cover the battery cell stack 200, and at the same time, can serve to guide the connection between the battery cell stack 200 and the external device. Specifically, a busbar 280 may be mounted to the busbar frame 130, and the electrode leads 111 and 112 of the battery cells 110 may pass through a slot formed in the busbar frame 130 and then be bent to be joined to the busbar 280. Thereby, the battery cells 110 constituting the battery cell stack 200 may be connected in series or in parallel.

The end plate 600 may be located on the opened first side (y-axis direction) and the second side (direction opposite to the y-axis) of the frame member 300 to cover the battery cell stack 200. The end plate 600 can physically protect the battery cell stack 200 and other electrical components from external impacts. A busbar frame 130 may be located between the battery cell stack 200 and the end plate 600.

Meanwhile, although not specifically shown in the figure, an insulating cover for electrical insulation may be formed between the busbar frame 130 and the end plate 600.

FIG. 6 is a cross-sectional view taken along the cutting line B-B' of FIG. 4.

Referring to FIGS. 4 and 6, the module frame 320 according to the present embodiment includes a plurality of unit housing sections S1 and S2. The structure of the module frame 320 is modified to form a shaping part F, and a plurality of unit housing sections S1 and S2 can be defined by the shaping part F. The battery cell stack 200 may be mounted in sub-units in each of the plurality of unit housing sections S1 and S2. The sub-unit battery cell stack 200a includes a plurality of battery cells 110. After the sub-unit battery cell stack 200a is mounted to the unit housing sections S1 and S2, through the joining between the electrode leads 111 and 112 and the busbar 280 on the busbar frame 130 described in FIG. 5, electrical connection can also be made between the sub-unit battery cell stacks 200a.

Specifically, the module frame 320 may include a bottom part 320a and two side surface parts 320b extending upward from both ends of the bottom part 320a. The bottom part 320a includes a plurality of plate-shaped members extending along the y-axis direction, and a shaping part F is formed between the two bottom parts 320a. The shaping part F may include two side surface parts separated by a first distance d1 and a connection part 320c connecting them. The connection part 320c can connect two side surface parts separated by a first distance d1 from upper ends of the side surface parts, at the upper ends of the side surface parts. The connection part 320c may have a curved surface that is protruded at the upper end. The shaping part F may have a U-shaped inverted shape.

A sub-unit battery cell stack 200a may be mounted in the plurality of unit housing sections S1 and S2 partitioned by the shaping part F. Each of the bottom parts 320a may cover a lower surface (direction opposite to the z-axis) of the sub-unit battery cell stack 200a, and the side surface part 320b and the shaping part F may cover both side surfaces (x-axis direction and direction opposite thereto) of the sub-unit battery cell stack 200a.

According to the present embodiment, the shaping part F is formed between the sub-unit battery cell stack 200a, and the cell swelling can be controlled by a sufficient swelling absorption effect when the cell swelling occurs. In addition, through the complete separation of the sub-unit battery cell stack 200a, it is possible to block the generation of heat propagation when the battery cell 110 ignites.

The side surface part of the shaping part F according to the present embodiment may be in contact with the outermost battery cell 110 of the sub-unit battery cell stack 200a. The shaping part F may be located in the central part of the battery module, and the battery cell 110 located in the central part can be in contact with the shaping part F, which is a shaping structure of a metal material, thereby facilitating heat dissipation. In other words, the shaping part F may be a cooling member. Thereby, the temperature deviation of the battery cell 110 between the central part and the outermost part can be reduced.

The connection part 320c of the shaping part F according to the present embodiment may be coupled to the upper plate 310. The connection part 320c of the shaping part F may be weld-coupled to the upper plate 310. The connection part 320c and the upper plate 310 of the shaping part F formed in the central part are weld-coupled, so that the welding section between the module frame 320 and the upper plate 310 can be increased to improve the rigidity.

The battery module according to the present embodiment further includes a compression pad 330 that are located between the side surface part 320b of the module frame 320 and the outermost battery cell 110 included in the sub-unit battery cell stack 200a.

FIG. 7 is a cross-sectional view showing a battery module obtained by modifying the embodiment of FIG. 6.

Since this embodiment is mostly the same as the embodiment described with reference to FIG. 6, only the differences will be described below.

Referring to FIG. 7, the battery module may further include a compression pad 340 located between the shaping part F and the outermost battery cell 110 close to the shaping part F. The expansion force caused by the generation of the swelling of the battery cells around the shaping part F can be absorbed by an additional compression pad 340.

Except for the differences described above, all the contents described in the embodiments of FIG. 6 are also applicable to the present embodiment.

Meanwhile, one or more battery modules according to an embodiment of the present disclosure can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and improvements can be devised by those skilled in the art, without departing from the spirit and scope of the principles of the invention described in the appended claims.

DESCRIPTION OF REFERENCE NUMERALS

110: battery cell
200: battery cell stack
310: upper plate
320a: bottom part
320b: side surface part
320c: connection part
F: shaping part
The invention claimed is:
1. A battery module comprising:
a plurality of battery cell stacks;
a module frame having a plurality of unit housing sections in which the plurality of battery cell stacks are housed, respectively;
an upper plate that covers an upper part of the plurality of battery cell stacks mounted to the module frame; and
a shaping part formed between the plurality of unit housing sections,
wherein the shaping part comprises two side surface parts separated from each other and a connection part connecting the two side surface parts, wherein the connection part connects the two side surface parts at upper ends of the two side surface parts, wherein the connection part has a curved surface that is protruded upward from the upper ends of the two side surface parts, and wherein the two side surface parts of the shaping part are in contact with an outermost battery cell of a respective one of the plurality of battery cell stacks mounted to the module frame.

2. The battery module according to claim 1, wherein the shaping part is formed by shaping the module frame, and the shaping part comprises a cooling member.

3. The battery module according to claim 1, wherein the two side surface parts of the shaping part are perpendicular to a stacking direction of battery cells in the plurality of battery cell stacks.

4. The battery module according to claim 1, wherein the plurality of battery cell stacks are separated from each other by the shaping part.

5. The battery module according to claim 1, wherein the connection part of the shaping part is coupled to the upper plate.

6. A battery pack comprising the battery module according to claim 1.

7. A battery module comprising:

a plurality of battery cell stacks;

a module frame having a plurality of unit housing sections in which the plurality of battery cell stacks are housed, respectively, and a shaping part formed between the plurality of unit housing sections, wherein the module frame comprises:

a plurality of bottom parts connected by the shaping part, each bottom part of the plurality of bottom parts defining a bottom of a respective unit housing section; and an upper plate, wherein the shaping part is in contact with an outermost battery cell of a respective one of the plurality of battery cell stacks, and wherein the shaping part is in contact with the upper plate.

8. The battery module according to claim 7, wherein the plurality of bottom parts and the shaping part are integrally formed.

9. The battery module according to claim 7, further comprising a compression pad in each of the plurality of unit housing sections, the compression pad located between the shaping part and an outermost battery cell of the battery cell stack in the respective unit housing section.

10. The battery module according to claim 7, wherein the plurality of bottom parts are spaced apart from each other.

\* \* \* \* \*